July 19, 1938.  R. PAWLIKOWSKI  2,123,959
OIL CATCHER
Filed Aug. 1, 1936   3 Sheets-Sheet 1

Inventor:
Rud. Pawlikowski

July 19, 1938.  R. PAWLIKOWSKI  2,123,959
OIL CATCHER
Filed Aug. 1, 1936  3 Sheets-Sheet 3

Inventor:
Rud. Pawlikowski

Patented July 19, 1938

2,123,959

UNITED STATES PATENT OFFICE 2,123,959

OIL CATCHER

Rudolf Pawlikowski, Goerlitz, Germany

Application August 1, 1936, Serial No. 93,811
In Germany August 2, 1935

1 Claim. (Cl. 184—6)

This invention relates to an oil catcher for the bearings of connecting rods in piston pressure engines, such as internal combustion engines.

The catching of lubricating oil at the bearings of connecting rods involves the difficulty of properly sealing the oil collectors with respect to the rotating crank cheeks or the connecting rod bearings executing an arcuate movement. It has not been possible hitherto fully to overcome this trouble, and all known oil catchers of this class still leave gaps through which the soiled oil of the crank case can mix with the fresh oil for the driving gear.

In contradistinction to a known proposal to extend the crank bearings beyond the edges of the bushes to accommodate special packing rings and to hold the crank shaft in axial direction by special bearings the invention eliminates the difficulty mentioned by constructing the crank cheeks as circular surfaces concentrically arranged relative to the axis of the crank shaft, for instance by means of shaped pieces secured thereto, which tightly embrace the edges of the bushes of the connecting rod and are guided at the circumference in stationary collecting pans.

Figure 1:
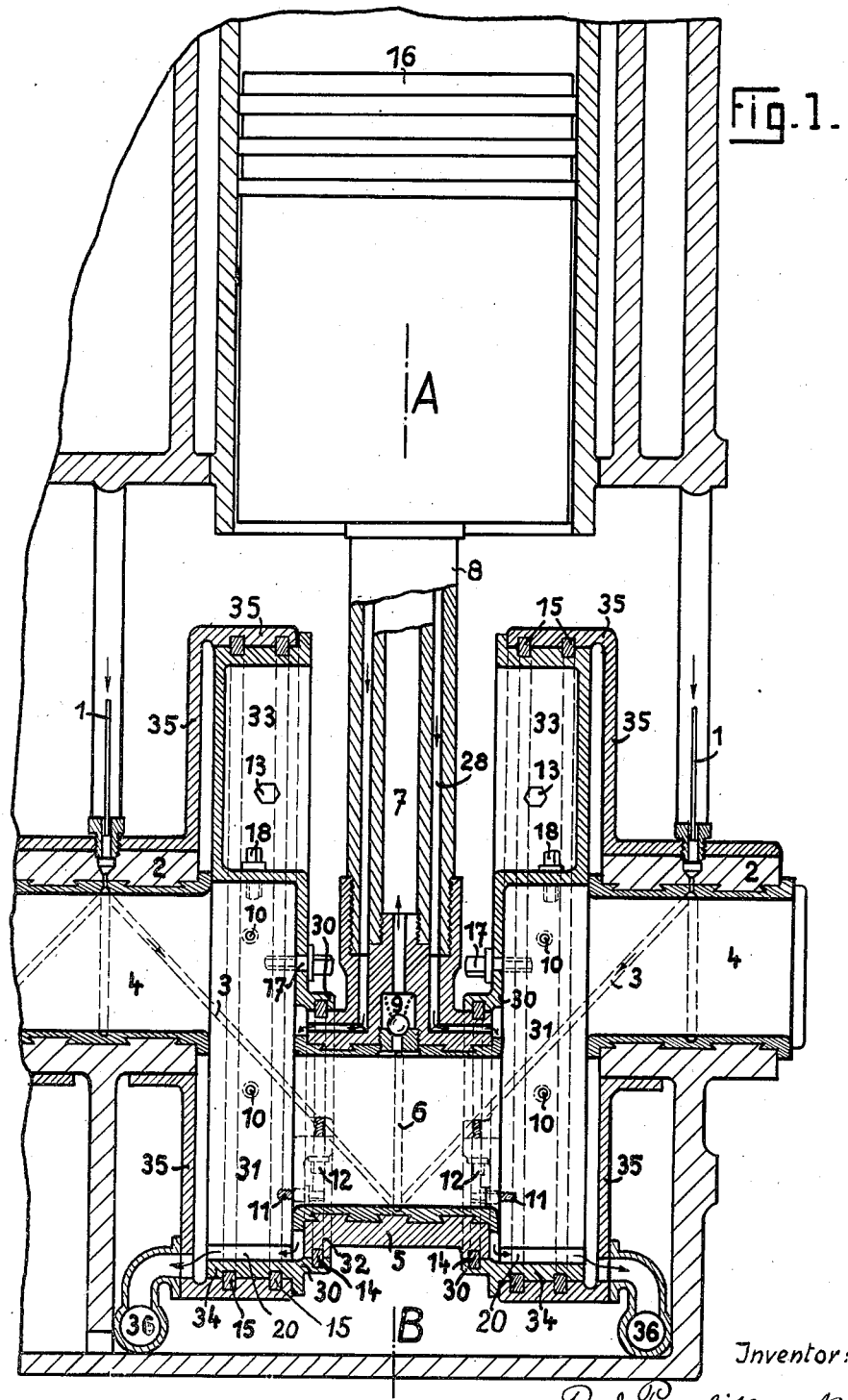
Figure 2:
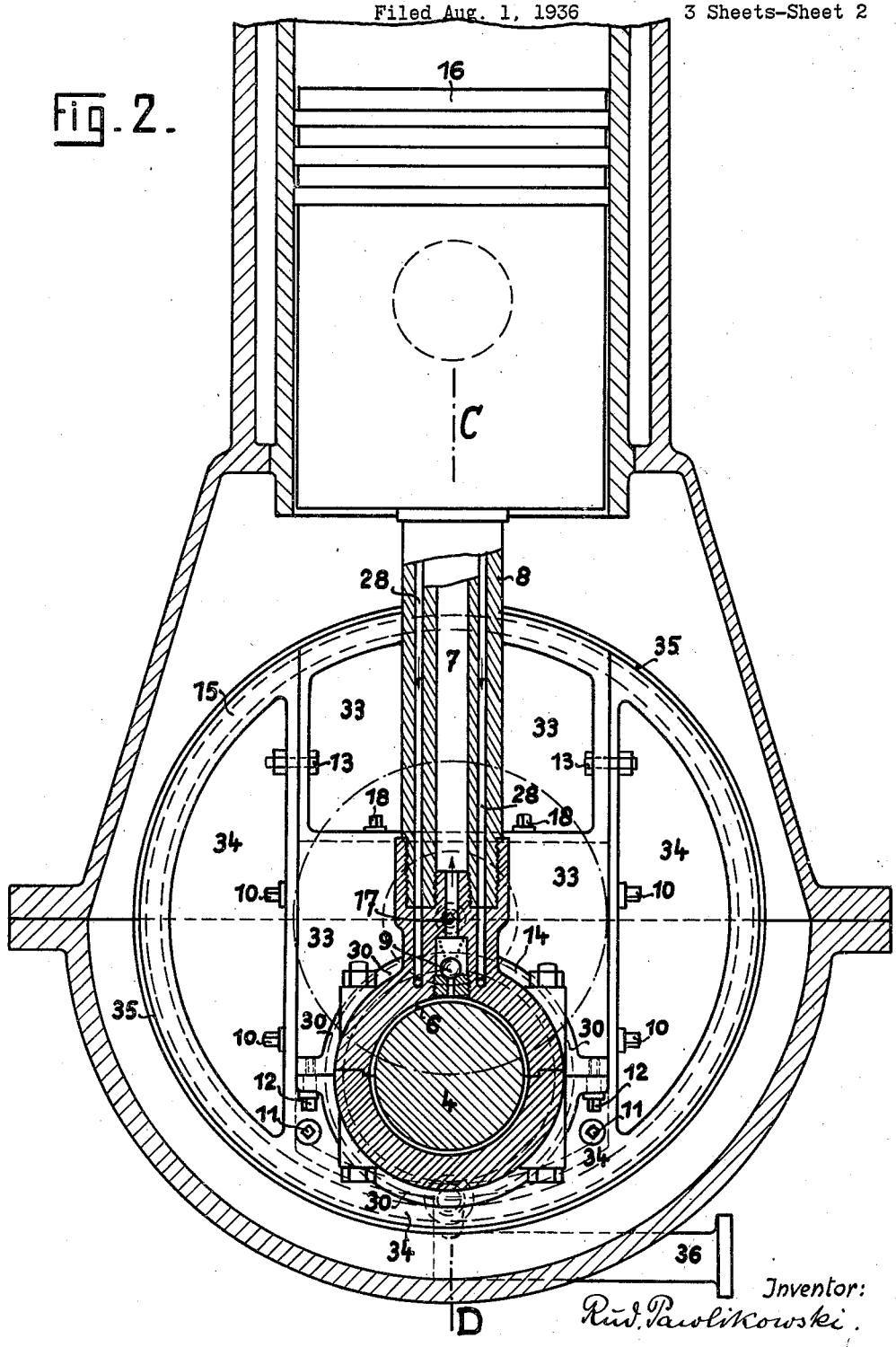
Figure 3:
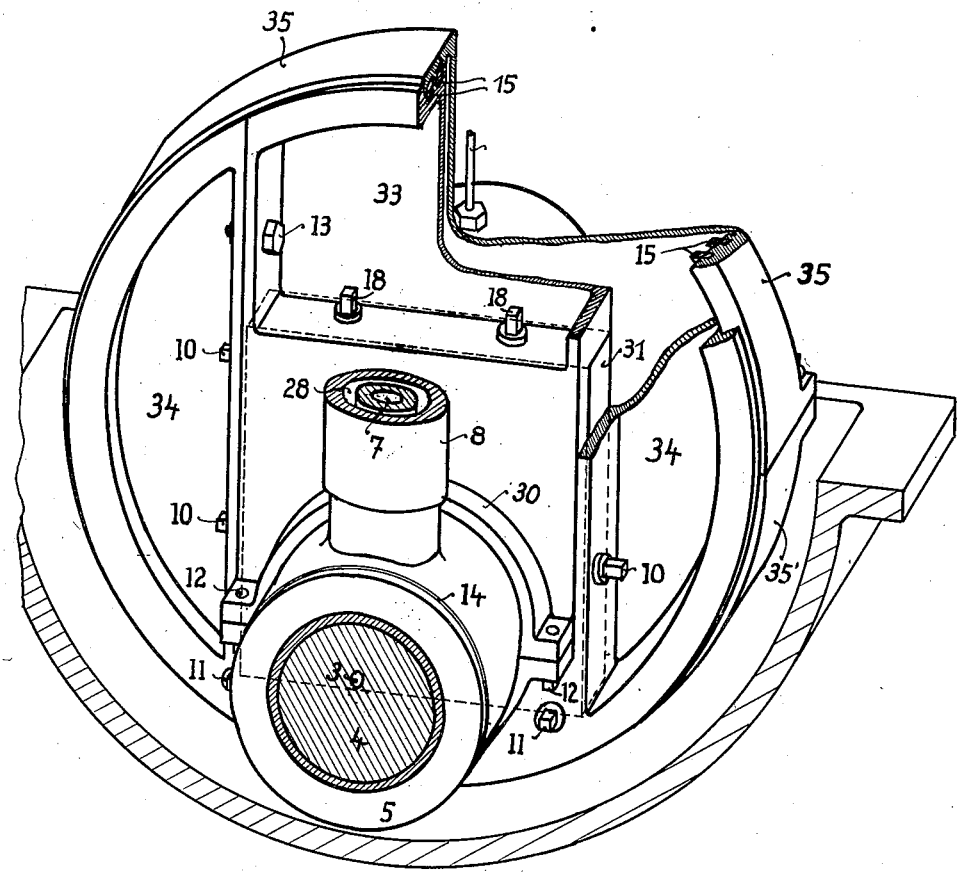

By way of example, the invention is illustrated in the accompanying drawings, in which Figures 1 and 2 are, respectively, a section longitudinally and transversely to the crank shaft through one embodiment of the invention and Fig. 3 is a perspective view of the parts shown in Figs. 1 and 2.

Referring to the drawings, oil for the bearings of the connecting rods and piston pins is forced in through the conduits 1 on the stationary crank bearings 2 and through the bores 3 of the crank shaft 4 and at the bearing 5 of the crank shaft 4 enters the annular groove 6, as indicated in Fig. 1. The ring groove 6 may be connected with the bore 7 of the connecting rod 8 and the lubricating oil supplied may then be passed also to the piston pin and piston head for lubrication or cooling by means of the check valve 9.

The oil thus used is preferably returned to the bearing 5 of the connecting rod by another return piping 28 provided in or on the connecting rod and then collected by the oil catchers 30 arranged on the crank cheeks 31 by means of the screws 10, 11, 17, 18 and tightly embracing the free edges 32 of the bushes. The oil catchers 30 are preferably made of two parts, the part 33 being pushed into the part 34 in the embodiment shown, as indicated in Fig. 2. Both parts 33 and 34 are connected at 12 and 13 and form a round disc which cooperates in the rotation of the crank shaft 4. This disc is tightly embraced by the fixed oil catcher 35, Fig. 1, which takes up the oil given off by the disc 33, 34. For passing the oil from the member 30 to the parts 35 the edge of the crank cheeks 31 is either provided with a recess to serve as oil groove or the cheeks 31 do not tightly fit the parts 34, Fig. 1, but leave a narrow gap 20 for the oil.

The second oil collecting disc 35 may also be constructed in two parts to facilitate installation.

From the fixed oil catchers 35 the oil is returned through the fixed pipings 36 to the oil pump, not shown.

The device according to the invention permits complete separation of the oil used for lubricating the driving gear from the piston oil. Piston oil contaminated by inorganic material left after complete combustion and running down on the cylinder wall cannot enter into circulation with the oil for the driving gear, and the latter oil can therefore be pumped back to the lubricating points without much purification.

Engines, in which the piston oil is not separated from the gear lubricating oil, frequently have heated bearings, especially crank shaft bearings, and particularly if pulverulent solid fuel is used. Extensive experiments have established the fact that oil used for lubricating the working surfaces of pistons and cylinders enters in its contaminated state the crank cheeks and thus circulates with the oil for lubricating the driving gear whereby the lubricating property of the gear oil is reduced and the dirt particles are enabled to cause heating at the points of maximum pressure, i. e., in the crank bearings, in spite of efficient lubrication. This trouble is completely eliminated by the device according to the invention, which of course can be equally effectively employed in connection with other lubricants and coolants.

I claim:—

In an internal combustion engine an oil catcher for the crankshaft and connecting rod bearings for preventing the contamination of the oil for lubricating the crankshaft and connecting rod bearings by the waste cylinder oil and simultaneously catching and separately leading off the lubricating or cooling oil passed through the hollow piston rod, comprising crank cheeks completed by parts secured to them to form circular faces concentric with the crankshaft axis, said parts tightly surrounding the edges of the bushes of the connecting rod and being embraced at the periphery by stationary catching discs.

RUDOLF PAWLIKOWSKI.